(12) United States Patent
Iden et al.

(10) Patent No.: US 7,841,280 B2
(45) Date of Patent: Nov. 30, 2010

(54) DRAG REDUCING DEVICES FOR STACKED INTERMODAL RAIL CARS

(75) Inventors: Michael E Iden, Kildeer, IL (US); Wayne A. Kennedy, Mondamin, IA (US); Matthew M. Larson, Omaha, NE (US); John P. Haenggi, Omaha, NE (US)

(73) Assignee: Union Pacific Railroad Company, Houston, TX (US)

( * ) Notice: Subject to any disclaimer, the term of this patent is extended or adjusted under 35 U.S.C. 154(b) by 0 days.

(21) Appl. No.: 12/822,687

(22) Filed: Jun. 24, 2010

(65) Prior Publication Data

US 2010/0258029 A1 Oct. 14, 2010

Related U.S. Application Data

(62) Division of application No. 12/118,393, filed on May 9, 2008, now Pat. No. 7,784,409.

(51) Int. Cl.
*B61D 17/00* (2006.01)
(52) U.S. Cl. ..................... 105/1.1; 105/1.2; 296/180.4
(58) Field of Classification Search ............... 105/1.1, 105/1.2, 1.3; 296/180.1, 180.2, 181.5, 181.1, 296/180.4, 180.5; 220/23.6; 206/504
See application file for complete search history.

(56) References Cited

U.S. PATENT DOCUMENTS

| 2,101,619 | A |  | 12/1937 | Lentz |  |
|---|---|---|---|---|---|
| 2,108,203 | A |  | 2/1938 | Lentz |  |
| 2,148,078 | A |  | 2/1939 | Lentz |  |
| 2,256,493 | A |  | 9/1941 | Radsdale |  |
| D179,222 | S |  | 11/1956 | Schaus |  |
| D220,220 | S |  | 3/1971 | Joy |  |
| 3,934,922 | A | * | 1/1976 | MacCready et al. | 296/180.4 |
| 4,030,779 | A |  | 6/1977 | Johnson |  |
| 4,057,280 | A |  | 11/1977 | MacCready, Jr. |  |
| 4,210,354 | A | * | 7/1980 | Canning | 296/180.4 |
| 4,236,745 | A |  | 12/1980 | Davis |  |
| 4,257,640 | A | * | 3/1981 | Wiley | 296/180.3 |
| 4,343,505 | A | * | 8/1982 | Levassor | 296/180.2 |

(Continued)

OTHER PUBLICATIONS

Photograph of EMD GP60 diesel freight locomotive, obtained from http://www.rrpicturearchives.net/showPicture.aspx?id=185887.

*Primary Examiner*—S. Joseph Morano
*Assistant Examiner*—Jason C Smith
(74) *Attorney, Agent, or Firm*—Pillsbury Winthrop Shaw Pittman LLP

(57) ABSTRACT

Disclosed is a series of stacked intermodal containers, being pulled by a locomotive of a train, with aerodynamic drag reducing devices. The series includes at least a first, leading set of containers and a second, trailing set of containers. The first, leading set of containers has an aerodynamic drag reducing device with a drag reducing fairing and an attachment frame attached thereto facing a forward direction. The attachment frame includes at least one mounting device configured to be removably mounted in the tunnel of the top container of the first, leading set of containers. Additionally, the second, trailing set of containers may include a second, aerodynamic drag reducing device, also attached via a gooseneck tunnel. Curtains may also be attached between a plurality of intermediate or adjacent sets of stacked containers to assist in reducing drag on the train when moving.

14 Claims, 14 Drawing Sheets

U.S. PATENT DOCUMENTS

| | | | |
|---|---|---|---|
| 4,441,751 A * | 4/1984 | Wesley | 296/180.1 |
| 4,702,509 A * | 10/1987 | Elliott, Sr | 296/180.4 |
| 4,738,203 A | 4/1988 | Gielow | |
| 4,746,160 A * | 5/1988 | Wiesemeyer | 296/180.2 |
| 4,756,256 A * | 7/1988 | Rains et al. | 105/1.1 |
| 4,909,154 A | 3/1990 | Walker | |
| 5,222,438 A | 6/1993 | Ende | |
| 5,355,806 A | 10/1994 | Bieber | |
| 5,465,669 A * | 11/1995 | Andrus | 105/1.1 |
| 5,562,374 A * | 10/1996 | Plamper | 410/66 |
| 5,577,449 A * | 11/1996 | Kleiner et al. | 105/26.05 |
| 6,286,894 B1 * | 9/2001 | Kingham | 296/181.5 |
| 6,585,312 B2 * | 7/2003 | Jain | 296/180.1 |
| 6,877,793 B2 * | 4/2005 | Cory | 296/180.1 |
| 6,959,958 B2 * | 11/2005 | Basford | 296/180.1 |
| 7,008,005 B1 * | 3/2006 | Graham | 296/180.4 |
| 7,017,508 B2 | 3/2006 | Vanmoor | |
| 7,073,845 B2 | 7/2006 | Ortega et al. | |
| 7,207,620 B2 * | 4/2007 | Cosgrove et al. | 296/180.4 |
| 2004/0239146 A1 * | 12/2004 | Ortega et al. | 296/180.2 |
| 2005/0139115 A1 * | 6/2005 | Harada et al. | 105/1.1 |
| 2008/0309122 A1 * | 12/2008 | Smith et al. | 296/180.1 |
| 2009/0179456 A1 * | 7/2009 | Holubar | 296/180.4 |

* cited by examiner

DRAG REDUCING DEVICES FOR STACKED INTERMODAL RAIL CARS

CROSS REFERENCE TO RELATED APPLICATION

This application is a divisional of U.S. patent application Ser. No. 12/118,393, filed May 9, 2008, the entire contents of which are incorporated herein by reference.

BACKGROUND

1. Field of Invention

The present invention is generally related to reducing aerodynamic drag on stacked intermodal containers.

2. Description of Related Art

Generally the use of stacked (or "double stacked") intermodal containers, wherein a top container is mounted on a bottom container, is known as a method of transporting goods on rail. For example, as shown in FIG. 1 and further described in detail below, a series 104 of stacked intermodal containers may be provided on stack cars 113 and pulled by a locomotive 102 along a rail 103 to form a train used for transporting goods on land. Though transporting intermodal containers in a double stack assists in lowering rail haul costs, it would be beneficial to further reduce such costs associated with rail transportation. For example, the expenses associated with operating a fuel (e.g., diesel) powered locomotive may significantly increase based on rising gas prices. Additionally, exhaust emissions of diesel fuel may cause damage and be harmful to the environment.

SUMMARY

One aspect of the invention provides a system for reducing aerodynamic drag of a series of stacked intermodal containers. The series has at least a first, leading set of containers with a top container stacked above a bottom container. Each of the containers has a top wall, a bottom wall, front wall, back wall, and side walls connected by a frame. The bottom wall has a tunnel extending from a first end of the container toward a second end of the container. The system includes an aerodynamic drag reducing device with a drag reducing fairing attached to an attachment frame. The attachment frame includes at least one mounting device extending rearwardly therefrom. The at least one mounting device of the attachment frame is configured to be removably mounted in the tunnel of the top container of the first, leading set of containers in a forward direction.

Another aspect of the invention includes a method for reducing aerodynamic drag of a series of stacked intermodal containers. The series has at least a first, leading set of containers with a top container stacked above a bottom container. Each of the containers has a top wall, a bottom wall, front wall, back wall, and side walls connected by a frame. The bottom wall has a tunnel extending from a first end of the container toward a second end of the container. The method of reducing drag includes providing an aerodynamic drag reducing device having a drag reducing fairing attached to an attachment frame and removably mounting the attachment frame using at least one mounting device extending rearwardly from the attachment frame in the tunnel of the top container of the first, leading set of containers.

One aspect of the invention provides a train having a locomotive and a series of stacked intermodal containers. The series has at least a first, leading set of containers and a second, trailing set of containers, and each set of containers has a top container stacked above a bottom container. Each of the containers has a top wall, a bottom wall, front wall, back wall, and side walls connected by a frame. The bottom wall of each container has a tunnel extending from a first end of the container toward a second end of the container. The first, leading set of containers has an aerodynamic drag reducing device with a drag reducing fairing and an attachment frame attached thereto. The fairing is attached to the attachment frame, and the attachment frame has at least one mounting device extending rearwardly therefrom. The at least one mounting device of the attachment frame is configured to be removably mounted in the tunnel of the top container of the first, leading set of containers facing a forward direction. The second, trailing set of containers has a second, aerodynamic drag reducing device having a drag reducing fairing attached to an attachment frame with at least one mounting device attached thereto. The second, aerodynamic drag reducing device is attached via the at least one mounting device to an end of the top container of the second, trailing set of containers facing a rearward direction.

In another aspect of the invention, a container for reducing aerodynamic drag of a train including a locomotive pulling a series of stacked intermodal containers is provided. The container has a top wall, a bottom wall, a front wall, a back wall, and side walls connected by a frame. The bottom wall has a tunnel extending from a first end of the container toward a second end of the container. The container has an aerodynamic drag reducing device with a drag reducing fairing and an attachment frame. The fairing is attached to the attachment frame. The attachment frame has at least one mounting device extending rearwardly therefrom that is configured to be permanently mounted in the tunnel of container. The container is stacked and removably secured on top of an intermodal container to form a set of containers. The set may be mounted behind the locomotive of the train.

Other objects, features, and advantages of the present invention will become apparent from the following detailed description, the accompanying drawings, and the appended claims.

BRIEF DESCRIPTION OF THE DRAWINGS

FIG. 4b illustrates a detailed view of the mounting device of the attachment frame of FIG. 4a;

DETAILED DESCRIPTION OF THE PREFERRED EMBODIMENT(S)

It is a goal of the present invention to reduce the amount of aerodynamic drag and vortices created among a series of stacked intermodal containers during transportation. Though intermodal containers are designed to be used in more than one form of transportation, e.g., railway, waterway, or highway, the embodiments below are herein described pertaining to their use on a railway.

Figure 1:
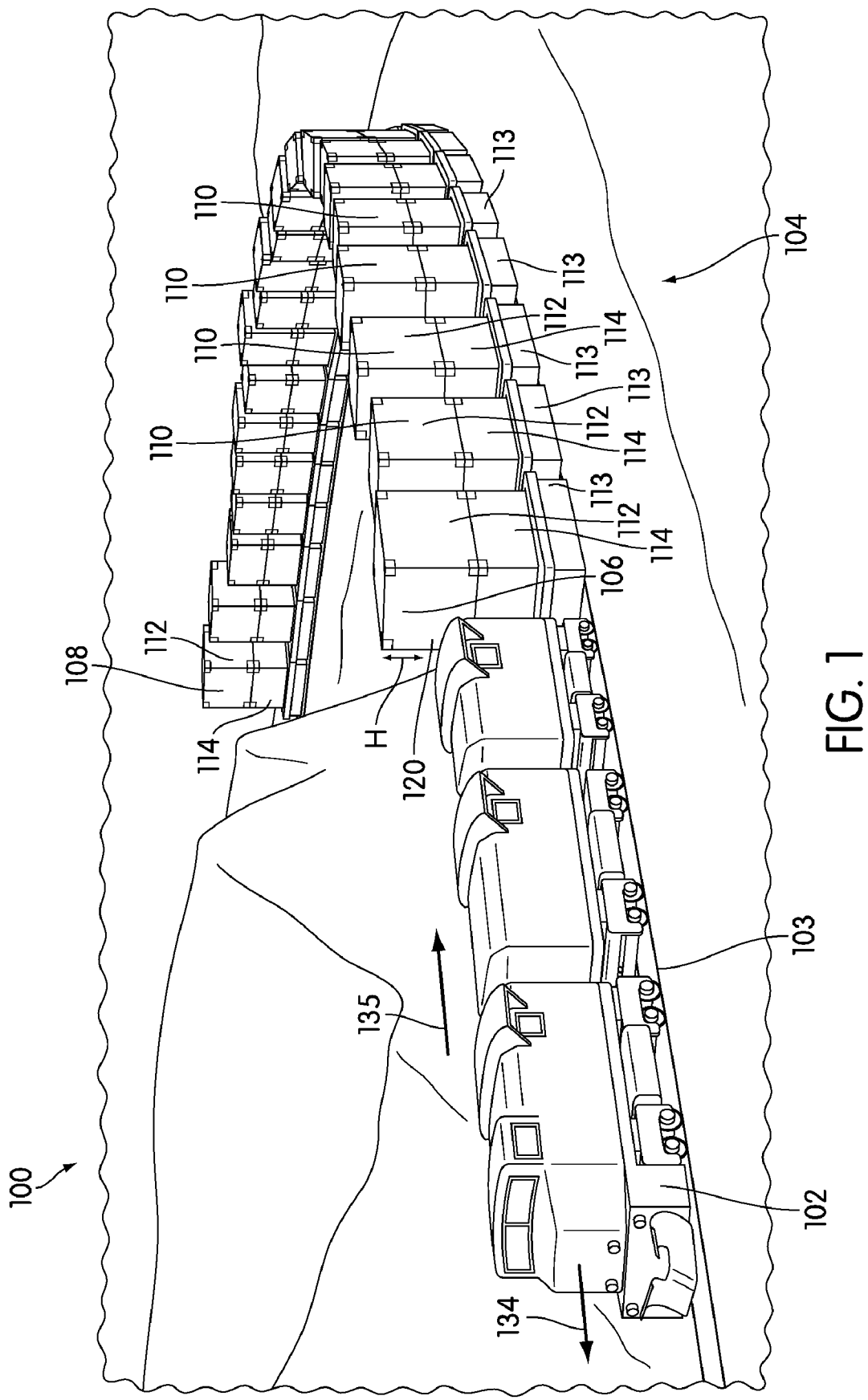
FIG. 1 illustrates a train comprising a locomotive pulling a series of stacked intermodal containers.

Referring now more particularly to the drawings, FIG. 1 illustrates a train 100 comprising a locomotive 102 pulling a series 104 of stacked intermodal containers, as previously noted. The locomotive 102 may be a vehicle that is diesel-powered to pull the series 104 of stacked intermodal containers on railroad tracks or rails 103, as is known in the art. As shown, the series 104 has at least a first, leading set 106 of stacked intermodal containers, and at least a second, trailing set of stacked intermodal containers 108. The first, leading set 106 of containers is defined as a first set of containers attached and adjacent to the locomotive 102. In an embodiment, the second, trailing set 108 of containers may be the last set in the series 104 of containers in the train 100. Alternatively, and more typically, a plurality of intermediate sets of stacked intermodal containers 110 is also be provided between the first, leading set 106 and the second or last trailing set 108. In an embodiment, one of the intermediate sets 110 of containers may be referred to as a second, trailing set.

Each set 106-110 of stacked intermodal containers is provided on a stack car 113, for example. The stack car 113, also known as a double stack car, is a railroad car that is designed to carry intermodal containers. The stack cars 113 are connected in series and are pulled (or pushed) by one or more locomotives 102.

Each set 106-110 of stacked intermodal containers comprises a top container 112 stacked or mounted on a bottom container 114, also referred to herein as a double stack. The mounting and/or locking of top and bottom containers 112 and 114, respectively, to each other in a stack is generally known in the art and is not discussed in detail herein. However, it is noted that a container, as herein described, is defined as a box container, bulk container, tank, or other storage device comprising a structure or frame that allows for stacking and mounting on top of one another. For example, in an embodiment, each of the containers 112, 114 comprises a top wall 116, a bottom wall 118, front wall 120, back wall 122, and side walls 124 connected by a frame 126 to form an enclosed box, for example (shown throughout the Figures). The containers as described herein may comprise various sizes and features. As generally known in the art, the side walls may comprise doors or openings allowing access to contents being held therein. The doors may be provided on a back wall, near the rear of the container, near the front of the container, on the sides of the container, or even access via the top of the container. Alternatively, a top wall may not be included. The dimensions or sizes of the containers should also not be limiting. For example, standard ISO (International Standards Organization) shipping containers comprising dimensions of 10 to 53 feet long, 8 feet to 9 feet 6 inches high, and 8 feet wide may be used for transportation. Additionally, the type of product held by the containers should not be limiting. For example, though a box container is generally described herein, the device may be used with bulk containers typically 20 to 28 feet long and/or tanks designed to hold liquids with a holding capacity of 4000-6000 gallons.

Figure 4A:
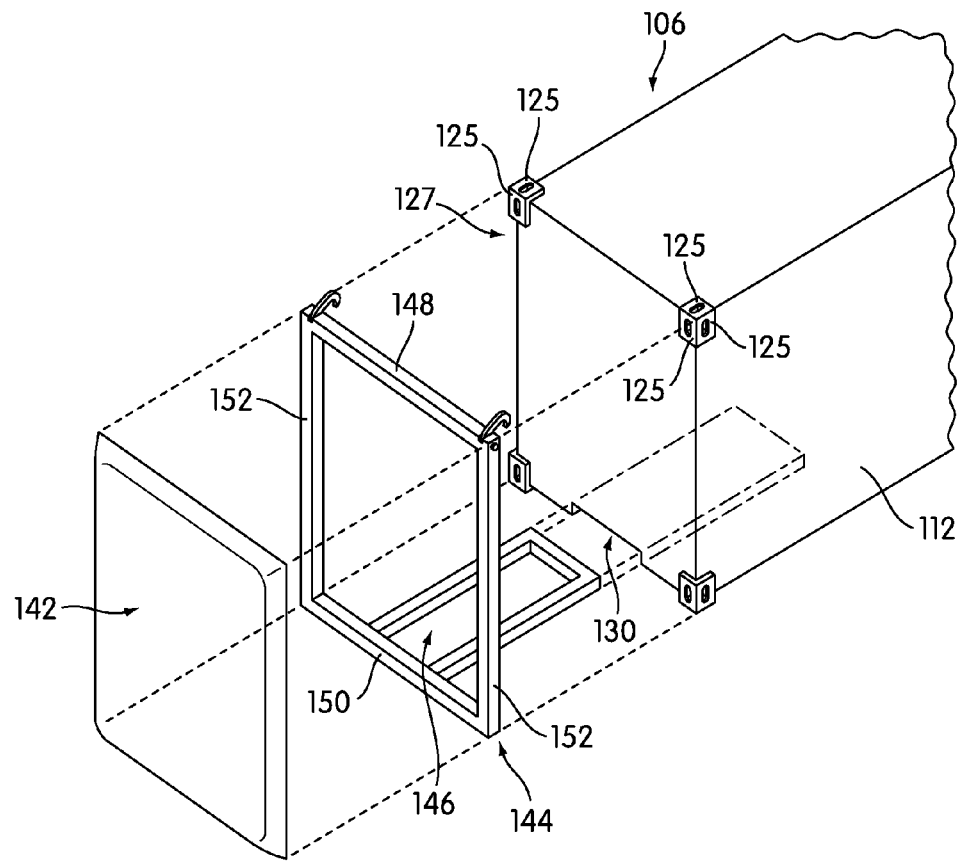
FIG. 4a illustrates a detailed, perspective view of an attachment frame and a mounting device of an aerodynamic drag reducing device used to attach a fairing of FIG. 3 in accordance with an embodiment of the present invention.
Figure 4B:
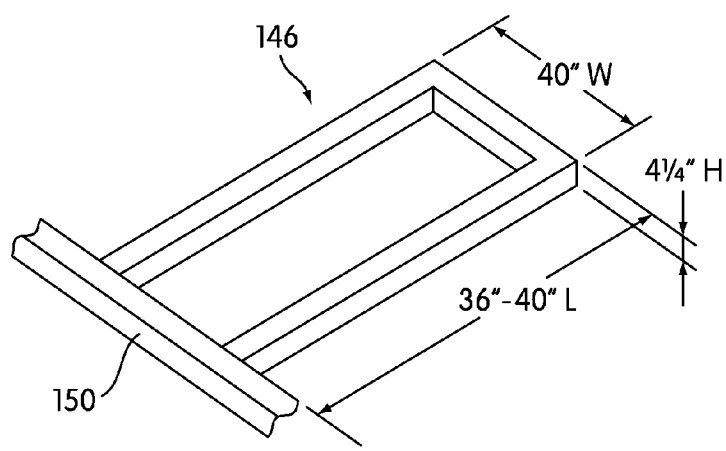
Figure 4C:
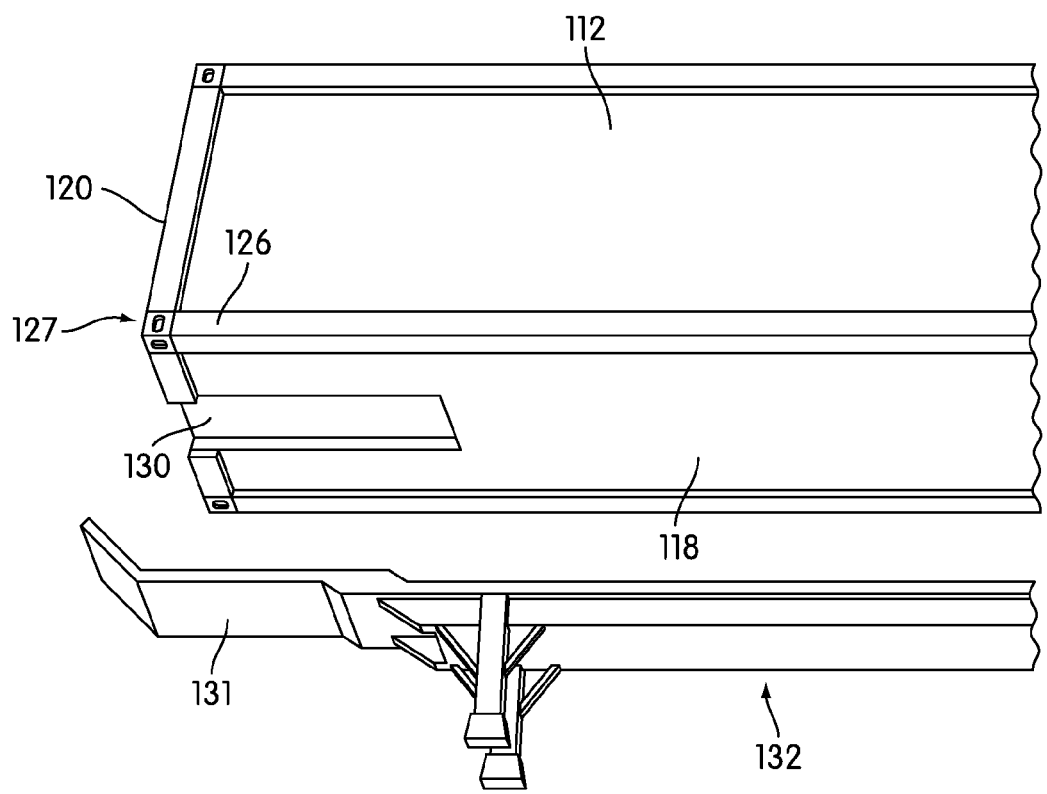
FIG. 4c illustrates a perspective view of the underside of a container comprising a tunnel for receiving the mounting device of FIG. 4b in accordance with an embodiment of the present invention.
Figure 4D:
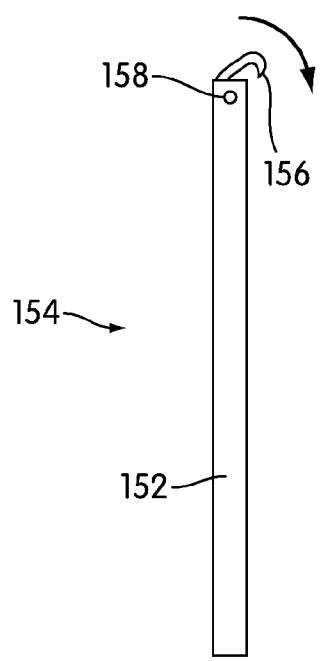
FIG. 4d illustrates a detailed view of a securing device for latching the attachment frame to a top corner of a container in accordance with an embodiment of the present invention.
Figure 4E:
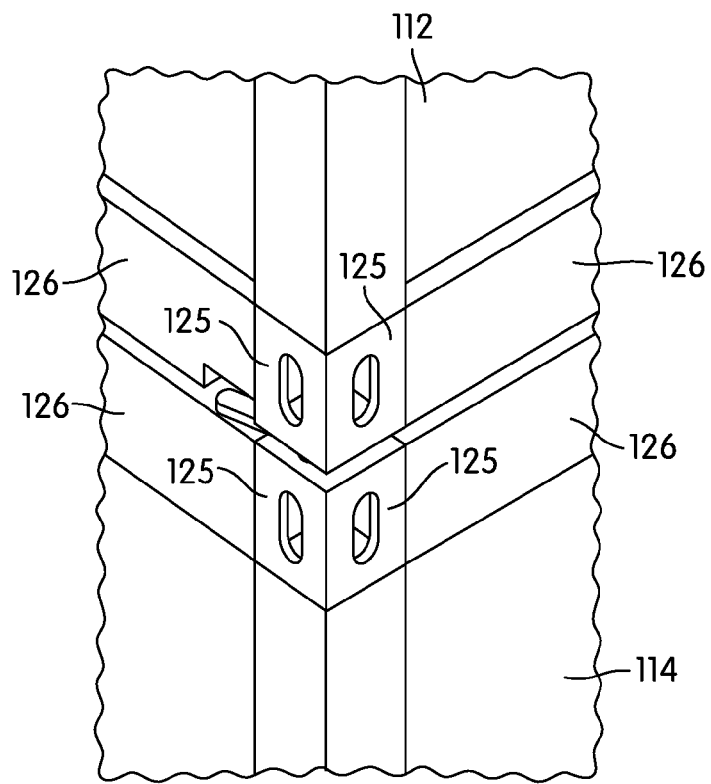
FIG. 4e illustrates a detailed view of corners of an intermodal container including connection openings for receiving the hook of FIG. 4d in accordance with an embodiment of the present invention.

Also, a structure or the frame 126 of each of the containers or tanks may also facilitate stacking The structure or frame 126 includes connection openings at each corner 125, such as shown in detail in FIG. 4e. The connection openings 125 are commonly used to connect or releasably lock the top container to the bottom container, for example.

In addition to any of the above mentioned features, standard ISO containers of larger size (e.g., 40, 45, 48, or 53 foot containers) comprise an attachment area configured to assist in moving the containers. That is, the bottom wall 118 of each container 112 or 114 comprises a tunnel 130 extending from a first end 127 of the container toward a second end 128 of the container. For example, the tunnel 130 may extend in a rearward direction from a front end 127 of the container. The tunnel 130, also commonly known as gooseneck tunnel, may also be a part of the frame 126 of the container. In an embodiment, the tunnel 130 may include frame members on either side to define the gooseneck tunnel. As shown in detail in FIG. 4c, the tunnel 130 is traditionally designed to receive or accommodate a front, projecting part 131 on a top surface of an over-the-road trailer or chassis 132. Typically the chassis 132 may comprise the projection part 131 at one end and a plurality of wheels (not shown) at an opposite end. The chassis 132 may be used to alone as transport or be provided as part of a stack car 112 to assist in pulling the containers along the rail 103, for example. The front, projecting part 131 comprises a shape corresponding to that of the tunnel 130 such that it may be insert into the tunnel 130 and thus attach or mount chassis 132 to the container.

When the series 104 of stacked intermodal containers are received on rail cars 112 attached to a locomotive 102, for example, as shown in FIG. 1, the series 104 of double stacked intermodal containers of the train 100 generally protrude a distance or a height H above the locomotive 102. For example, the height H may be five to six feet above the highest point or height of the locomotive 102. Such a height difference provides a significant source of aerodynamic drag while pulling the series 104 of containers in a forward direction (as indicated by arrow 134). As the containers are pulled in a forward direction 134, the air flow (as indicated by arrow 135) creates drag in an opposite direction. Some wind tunnel studies have shown, for example, that the first 20% of a train 100 produces the most drag. Thus, a transition between locomotive 102 and first set 106 of containers that assists in reducing the overall aerodynamic drag of the train 100 would be beneficial. Additionally, air forces or vortices may be formed around the edges of and between the adjacent sets of containers when moving in a forward 134 direction at high speeds. Attaching additional aerodynamic drag reducing devices as further described herein to reduce the drag and vortices of the stacked intermodal containers of the train 100 while moving thus provides a plurality of benefits.

Figure 2:
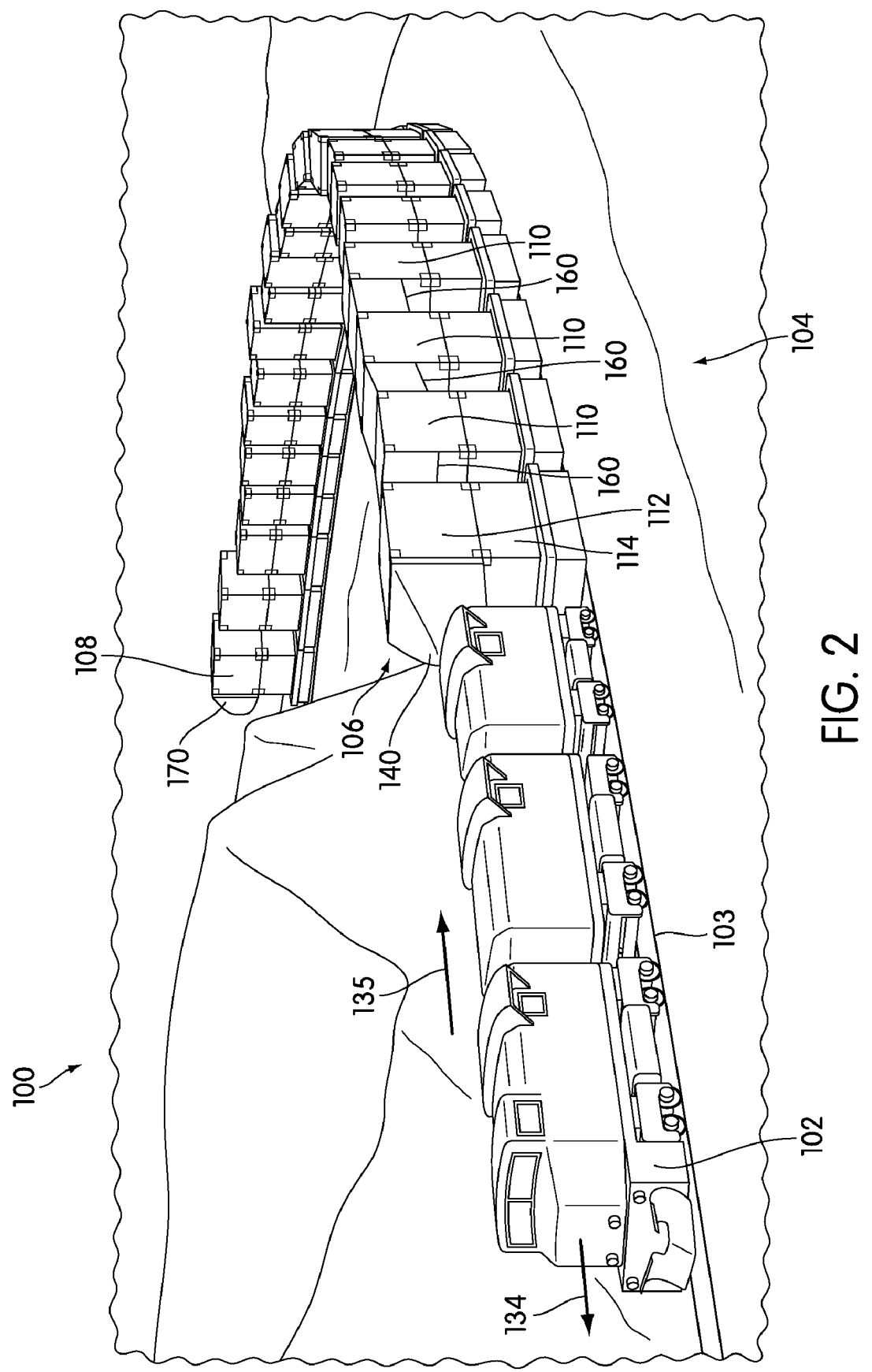
FIG. 2 illustrates the train of FIG. 1 comprising a system of aerodynamic drag reducing devices in accordance with an embodiment of the present invention.

FIG. 2 illustrates the train 100 of FIG. 1 comprising a system of aerodynamic drag reducing devices in accordance with an embodiment of the present invention. In an embodiment, at least one aerodynamic drag reducing device 140 may be provided on the front of a first set 106 of stacked intermodal containers to assist in reducing the amount of drag of a moving train 100. In an embodiment, the aerodynamic drag reducing device 140 is mounted to the top container 112 of the first, leading set 106 of double stacked train of intermodal containers. The aerodynamic drag reducing device 140 comprises a fairing 142 and an attachment frame 144. The fairing 142 is attached to the top container 112 at a first end 127 such that as the train 100 moves in a forward direction 134, air coming up and over the locomotive 102 may be directed over the top of at least the first set 106 of containers in the series 104, thus reducing the resistance or drag. The attachment frame 144 is designed to attach or mount the fairing 142 onto first or front ends 127 of the top container 112. The fairing 142 is attached to at least a part of the attachment frame 144.

Figure 3:
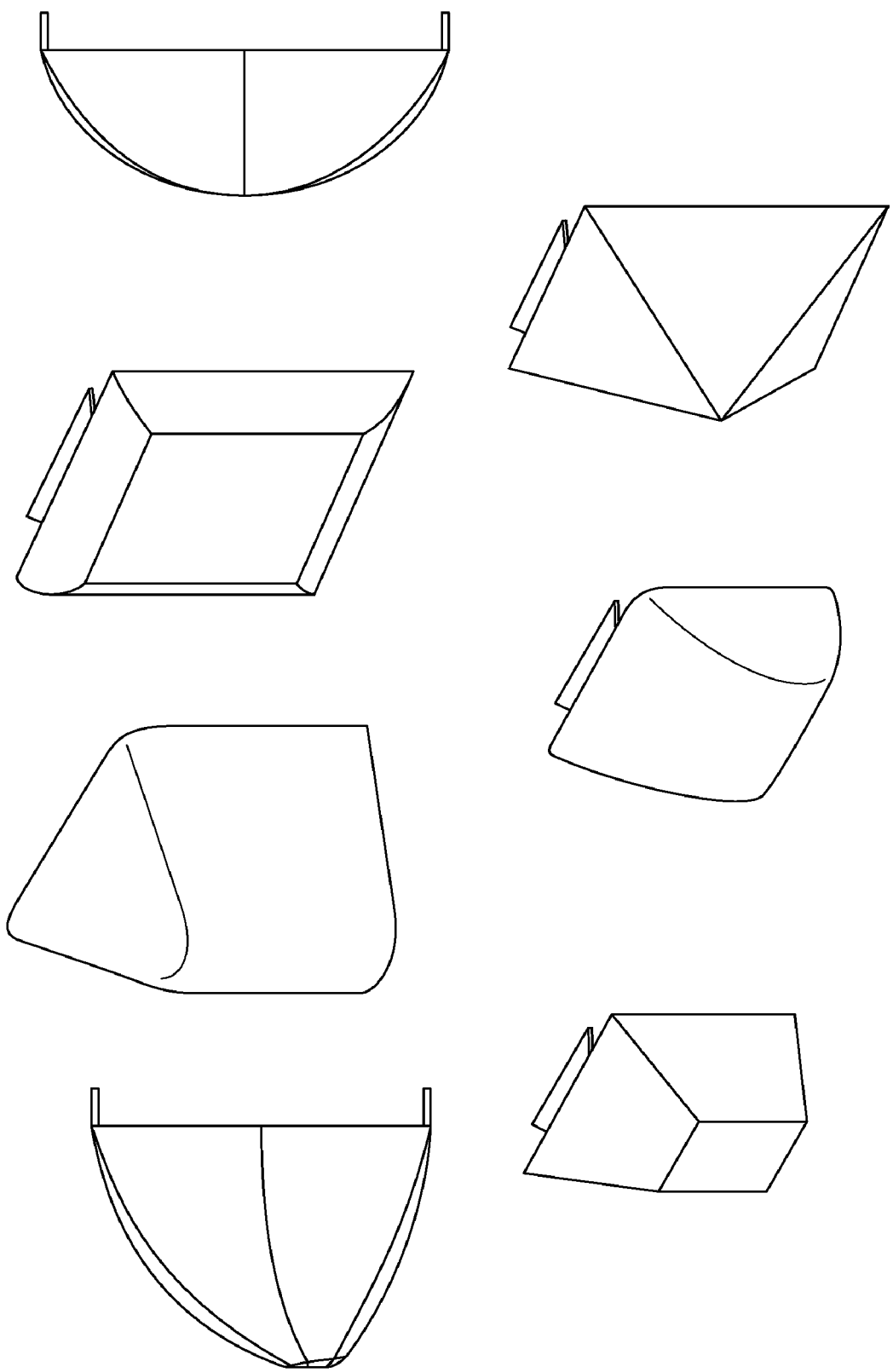
FIG. 3 illustrates multiple detailed views of fairings of an aerodynamic drag reducing device in accordance with an embodiment of the present invention.

FIG. 3 illustrates multiple detailed views of fairings of that may be used with aerodynamic drag reducing device 140 in accordance with an embodiment of the present invention. The fairing 142 comprises at least one radiused edge. In an embodiment, the fairing 142 may comprise a first, substantially rounded end at the bottom thereof (e.g., to be mounted near the bottom wall 118 of a container) that extends and tapers upwardly toward a second end near the top (e.g., to be mounted near the top wall 116 of a container). In an embodiment, the fairing 142 comprises a lightweight material that is able to withstand the aerodynamic forces to which it will be subjected (e.g., withstands forces of 12-mph head winds when moving in a forward direction 134). For example, the fairing 142 may comprise fiberglass materials.

In an embodiment, the aerodynamic drag reducing device 140 is designed to utilize the gooseneck tunnel 130 of the top container 112 of the first, leading set 106 of stacked intermodal containers for mounting. More specifically, when a top container 112 is stacked on a bottom container 114, the tunnel 130 of the top container 112 is unrestricted and provides an accessible opening. Utilizing the tunnel 130 for attachment or mounting of the drag reducing device 140 is beneficial as the tunnel 130 is an existing device and no modification needs to be made to the container 112 or its frame 126. In order to use the gooseneck tunnel 130 as a location for securing the fairing 142 of the drag reducing device 140, the first end 127 of the top container 112 is loaded, i.e., stacked, with the tunnel 130 facing toward the front of the train 100, or toward the locomotive 102. The attachment frame 144 is then used to mount the fairing 142 within the tunnel 130 of the container 112.

FIGS. 4a and 4b illustrate detailed, perspective views of an attachment frame 144 and a mounting device 146 of the aerodynamic drag reducing device 140 that is used to attach the fairing 142 to the top container 112 of the first, leading set 106 of stacked intermodal containers in accordance with an embodiment of the present invention. The attachment frame 144 comprises a top portion 148, bottom portion 150, and side portions 152, and at least one mounting device 146 extending outwardly from the bottom portion 146 thereof. The frame 144 may comprise any number of materials, such as aluminum. In an embodiment, the fairing 142 is securely attached to any number of portions 148-152 of the frame 144. The at least one mounting device 146 of the attachment frame 144 is designed such that it may be inserted to fit securely within in the tunnel 130 of the top container 112 of the first, leading set 106 of containers. In an embodiment, the at least one mounting device 146 comprises a substantially rectangular shape similar to the tunnel 130. For example, the tunnel 130 may comprise dimensions of approximately 128 inches long, 40½ inches wide, and 4⅝ inches high. The mounting device 146 may be designed to be approximately 36 to 40 inches long, 40 inches wide, and 4¼ inches high.

In an embodiment, the mounting device 146 may be such that it comprises any number of shapes and sizes that can be inserted and secured in the tunnel 130. For example, the mounting device 146 may comprise a substantially U-shape that is attached to the bottom portion 150 of the attachment frame. However, the shape of the mounting device 146 should not be limited to such an arrangement. Generally, the mounting device 146 may be formed of a shape that may be at least partially inserted into tunnel 130 to assist in mounting device 140 therein. In an embodiment, the mounting device 146 may comprise one or more structures for insertion into the tunnel 130. For example, the mounting device 146 may comprise two substantially straight, rod-like structures.

Figure 4F:
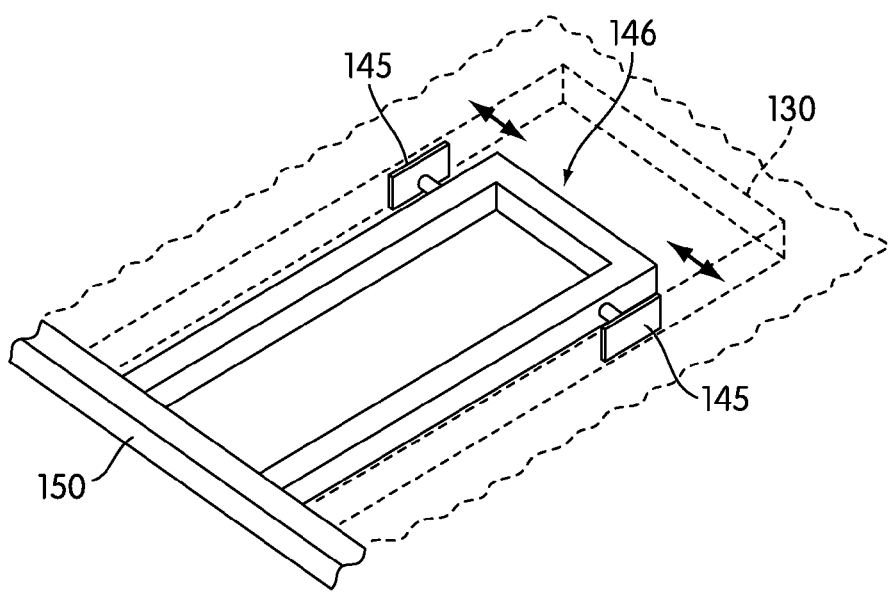
FIG. 4f illustrates a releasable clamping device that may be used with the mounting device of FIG. 4b to mount to the inside of the gooseneck tunnel in accordance with an embodiment of the present invention.

In an embodiment, a releasable clamping device 145 in the form of clamps or shoes may be provided for releasably securing the at least one mounting device 146 within the gooseneck 130 to assist further secure the drag reducing device 140 therein, as shown in FIG. 4f. For example, the clamps or shoes 145 may be designed to extend from the side portions of the U-shape of the mounting device 146 (as shown by arrows), and securely fasten against inside walls of the tunnel 130. Alternatively, when removing the drag reducing device 140, the clamping devices 145 may be retracted toward the U-shape portion of the mounting device 146 to thus release it from being locked within the tunnel 130. Thus releasable clamping devices may be activated in any number of ways and should not be limiting.

FIG. 4d illustrates a detailed view of a securing device 154 for latching the attachment frame 144 of the drag reducing device 140 to at least the connecting openings 125 in the top corners of the top container 112 in accordance with an embodiment. As previously noted, containers 112 or 114 comprise connection openings 125 in the corners thereof. For example, the openings 125 may be provided on a front end 127, a side end, or a top end of the corners of the frame 126 as shown in detail in FIG. 4e. The securing devices 154 may be attached to each side 152 of the attachment frame 114. The securing devices 154 may be secured within the existing connection openings 125 of the containers, further allowing mounting of the drag reducing device 140 without modification of the container. The securing devices 154 may comprise hooks 156, for example, that may be pivotally attached 158 to the attachment frame 144 to for hinged movement of each of the hooks 156 into the connection openings 125 of the container 112.

Figure 5A:
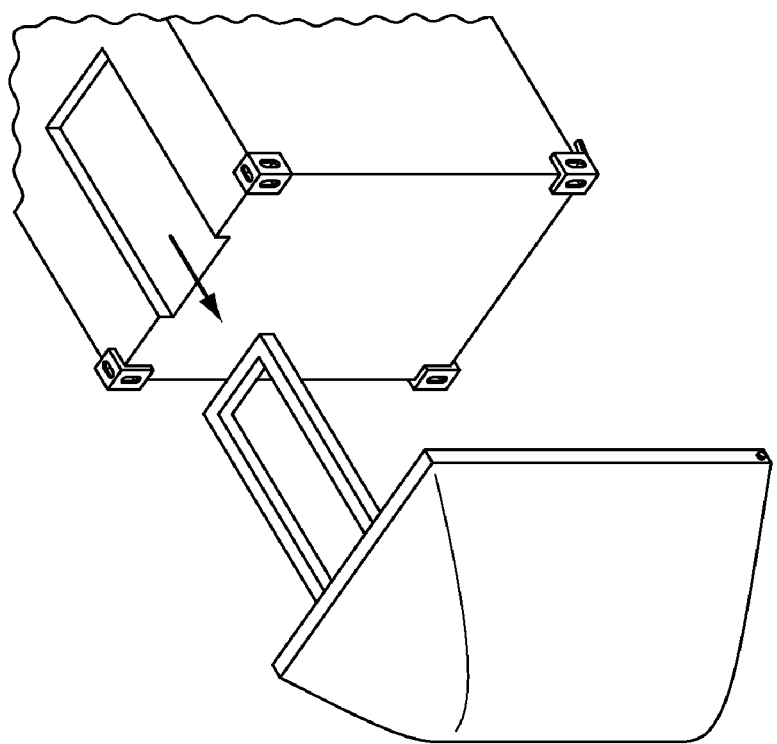
FIG. 5a illustrates top and bottom perspective views of the attachment of the aerodynamic drag reducing device of FIG. 4a to a top container of a set of stacked intermodal containers.
Figure 5A:
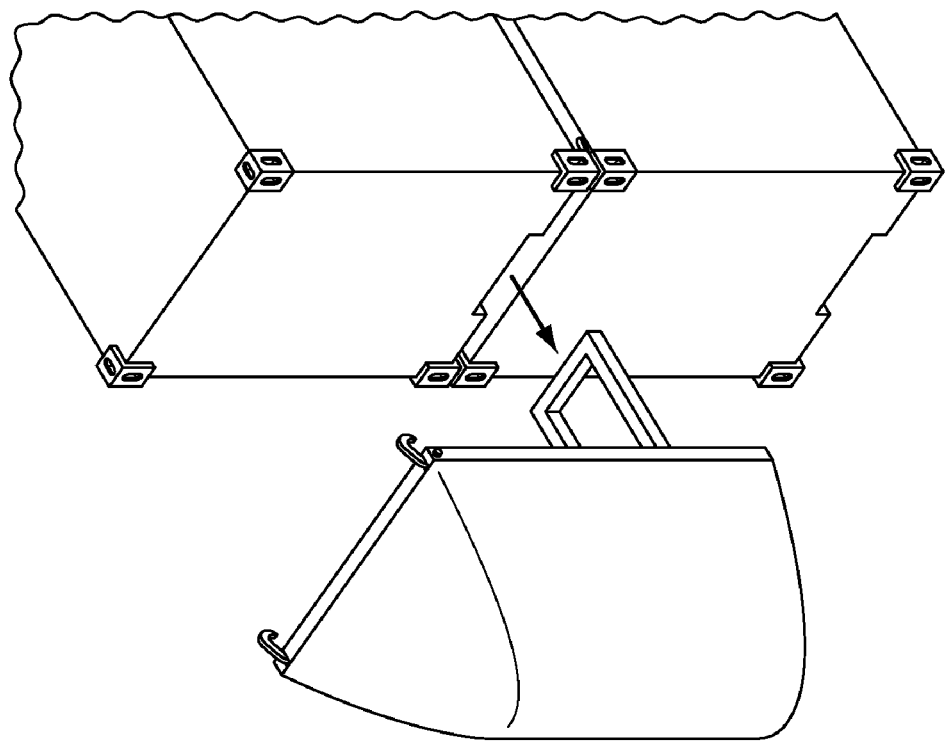
Figure 5B:
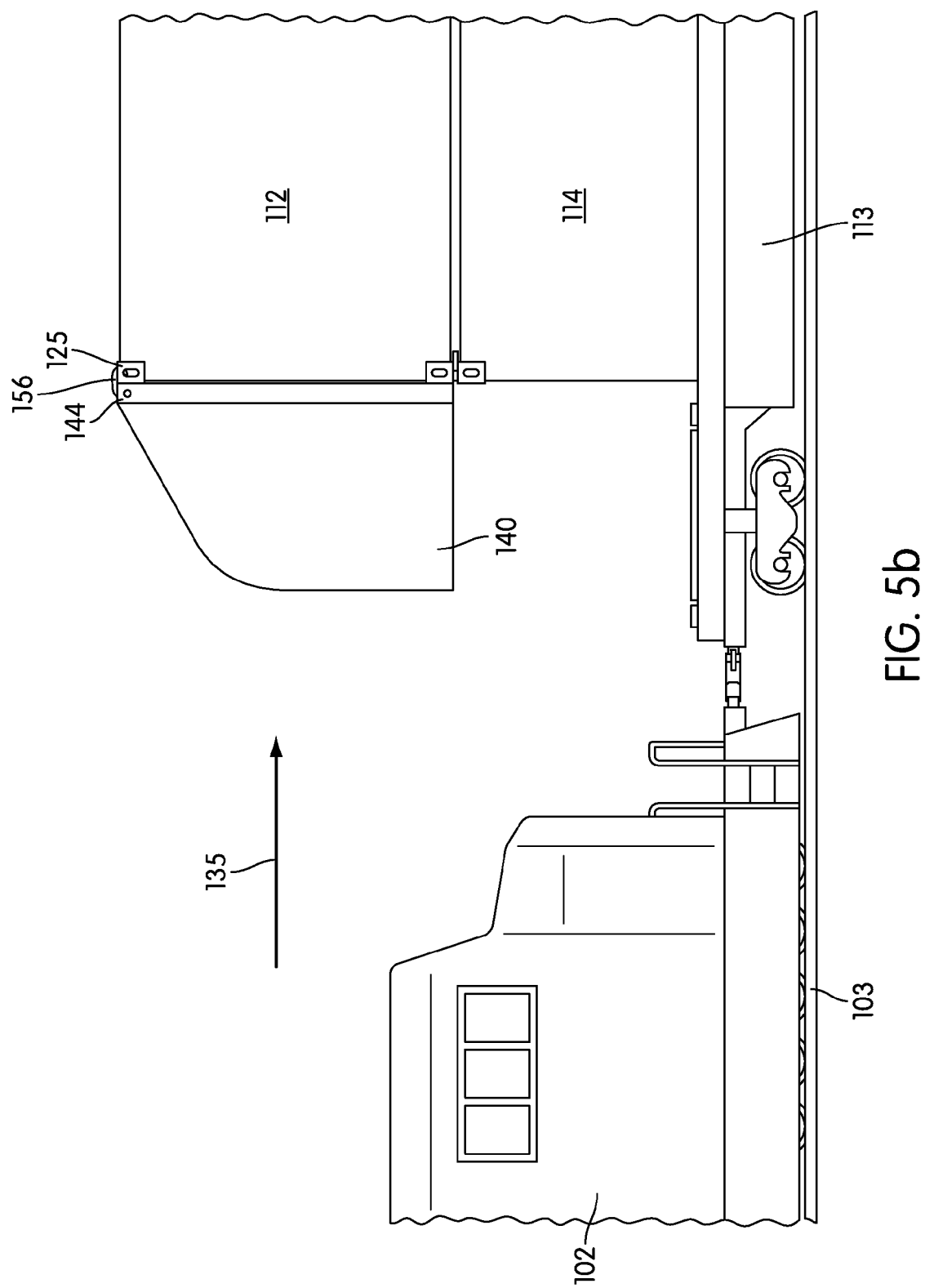
FIGS. 5b and 5c illustrate side and top views, respectively, of the aerodynamic drag reducing device attached to the top container of a first, leading set of stacked containers in accordance with an embodiment of the present invention.
Figure 5C:
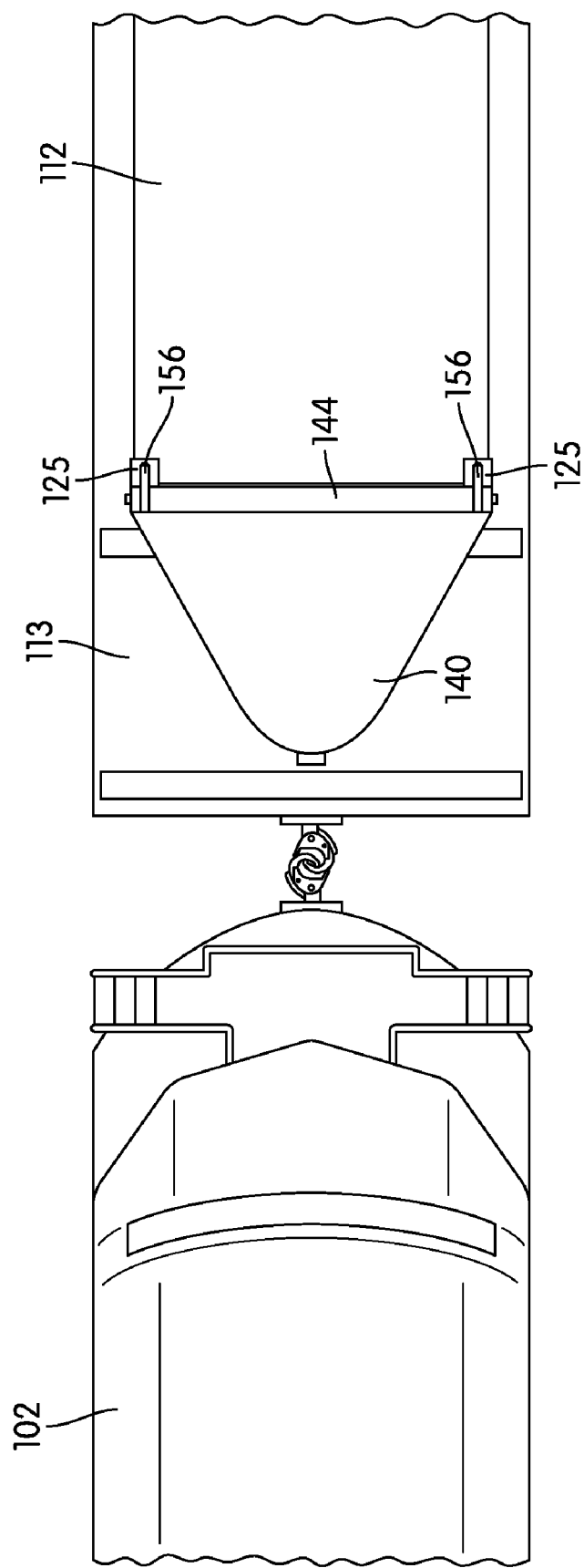

FIG. 5a illustrates top and bottom perspective views of the attachment of the aerodynamic drag reducing device 140 to a top container 112 of the first, leading set 106 of stacked intermodal containers. After the first set 106 of containers are stacked with the tunnel 130 of the top container 112 facing a forward direction, the mounting device 146 of the frame 144 is aligned with the tunnel 130 formed in the bottom wall 118 of the top container 112. The mounting device 146 is then inserted into the tunnel 130 until the fairing 142 is aligned with the front wall 120 of the container 112. After the mounting device 146 is fully inserted, the securing devices 154 are pivoted such that the hook ends 156 are inserted into the corresponding openings 125 in the top of the frame 126 to securely fasten the drag reducing device 40 to the first end 127 of the top container 112. FIGS. 5b and 5c illustrate side and top views, respectively, of the aerodynamic drag reducing device 140 when securely attached to the top container 112.

The aerodynamic drag reducing device 140 provides several advantageous features. For example, a properly designed fairing, such as fairing 142, securely attached to a first, leading set 106 of containers will significantly reduce aerodynamic drag at a front end of the train when moving in a forward direction 134. Such a reduction in aerodynamic drag and vortices thus provides the potential to reducing fuel consumption. A small reduction in fuel consumption, such as one percent, may equate to a reduction of running costs by several million dollars annually for a large rail operator. Additionally, the device 140 itself does not create significant lift and is low in cost to produce.

The drag reducing device 140 is also designed such that it may be easy to install by operators as the container need not be adjusted or modified since it uses existing holes and openings (e.g., tunnel 130 and openings 125). The device 140 also allows for simplified installation (or removal) without risk of harm or injury to the fairing 142, the container, or the operators. In an embodiment, the aerodynamic drag reducing device 140 may be a removable structure that may be attached to any number of top containers in a set of stacked intermodal containers.

Alternatively, in an embodiment, the aerodynamic drag reducing device 140 may be permanently attached to a specified intermodal container. For example, a container may be designed as a "dummy" container, such that it appears similar to other intermodal containers but is designed primarily for aerodynamic purposes only. The dummy container may comprise a top wall, a bottom wall, a front wall, a back wall, and side walls connected by a frame. The bottom wall of the dummy container may also have a tunnel extending from a first end of the container toward a second end of the container. The dummy container is preferably designed such an aerodynamic drag reducing device is permanently attached thereto. The aerodynamic drag reducing device may comprise a drag reducing fairing, an attachment frame, and at least one mounting device extending rearwardly therefrom as described above. By permanently mounting the at least one mounting device in its tunnel, the dummy container may be stacked and removably secured to the top of another intermodal container to thus form a set. That is, the dummy container may be designed to be interchangeable such that the dummy container may be the top container of the first, leading set of containers in a train.

In an embodiment, the drag reducing fairing may be permanently attached to the connection openings 125 of the container. The methods and devices used to permanently attach a drag reducing device to a container should not be limiting.

In an embodiment, the fairing 142 of the drag reducing device 140 may be adjustable such that it may be fitted to containers of differing dimensions.

Figure 6A:
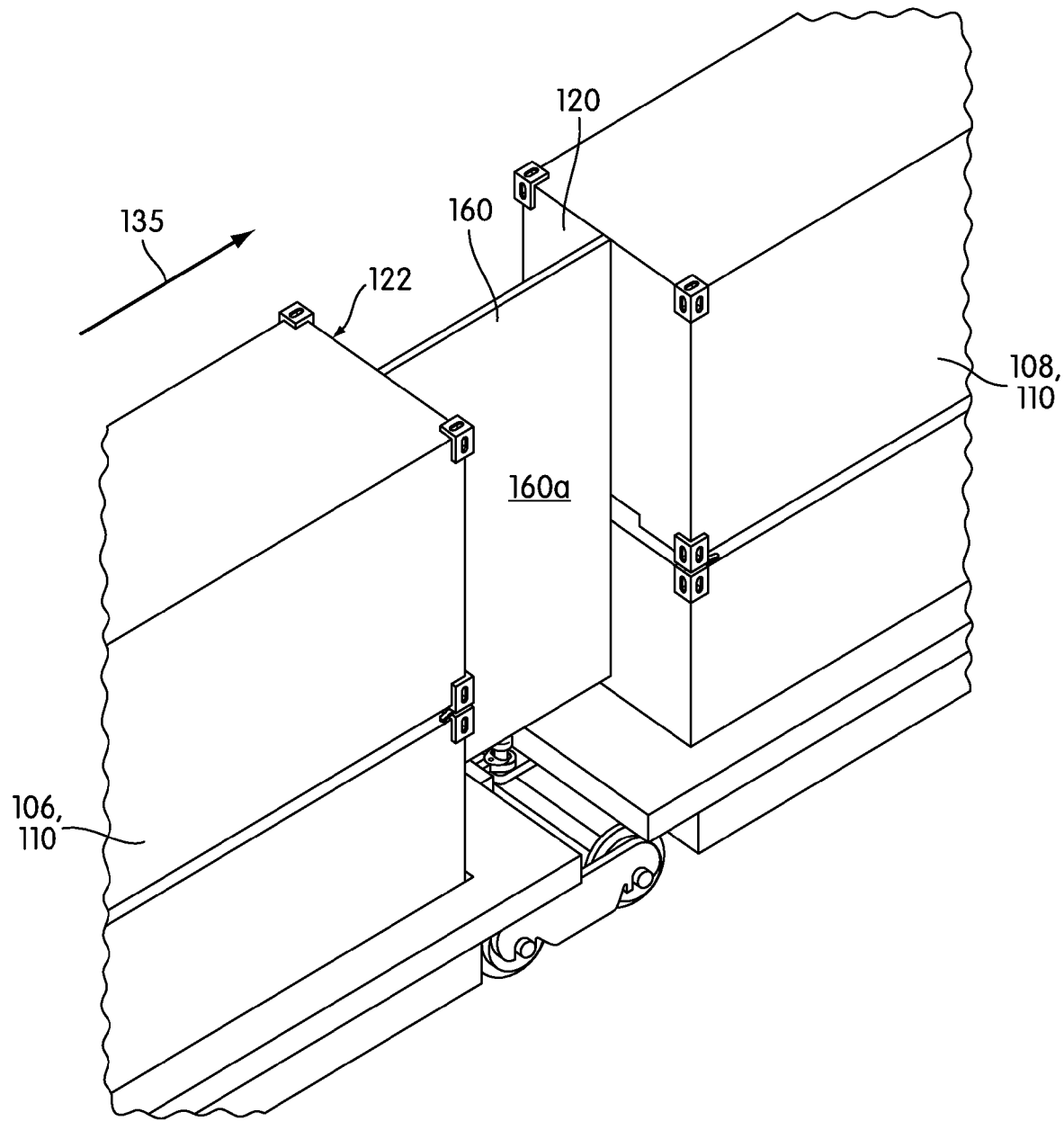
FIGS. 6a-6c illustrate perspective views of curtains for reducing aerodynamic drag or vortices between adjacent sets of stacked intermodal containers in accordance with an embodiment of the present invention.
Figure 6B:
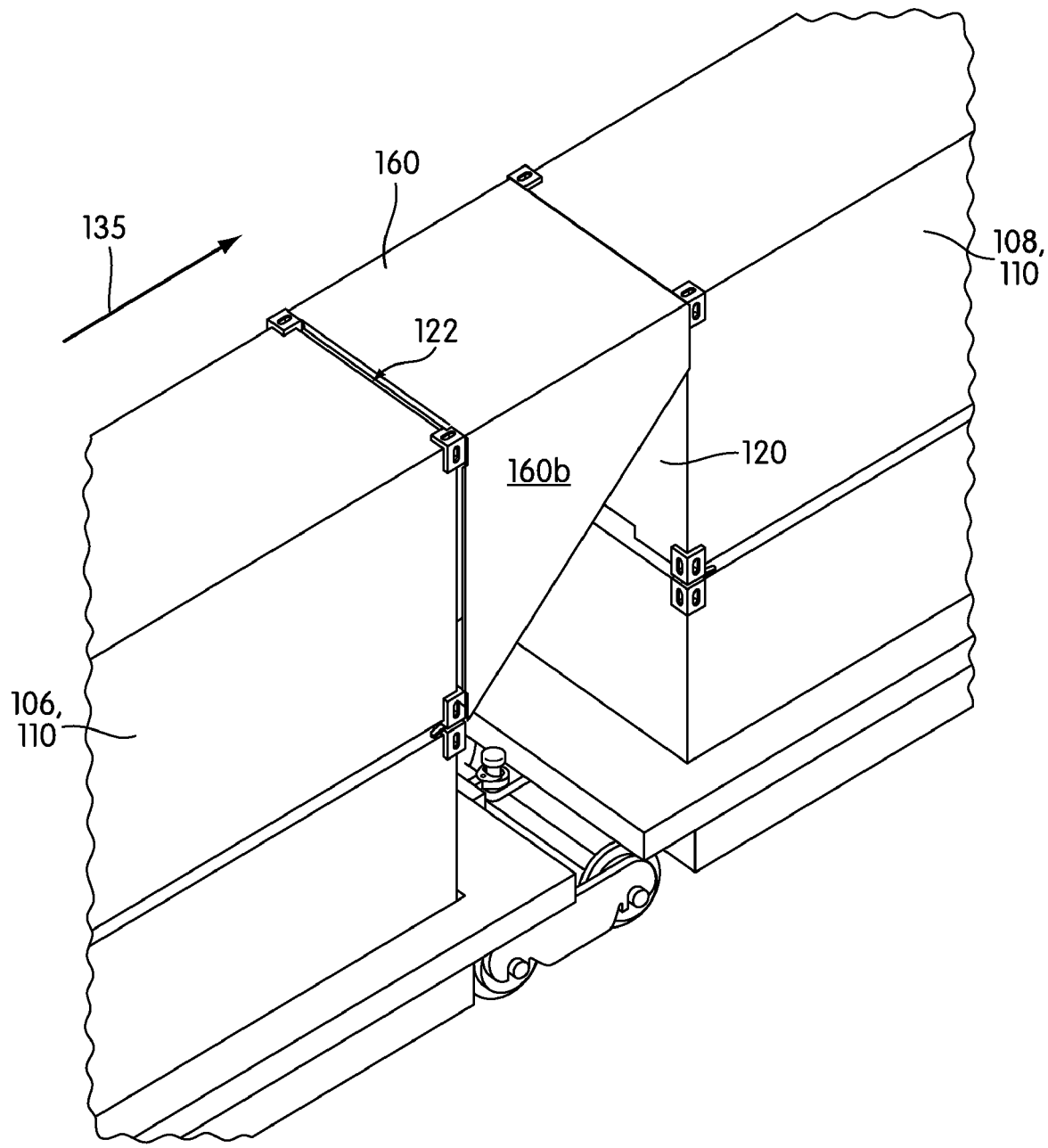
Figure 6C:
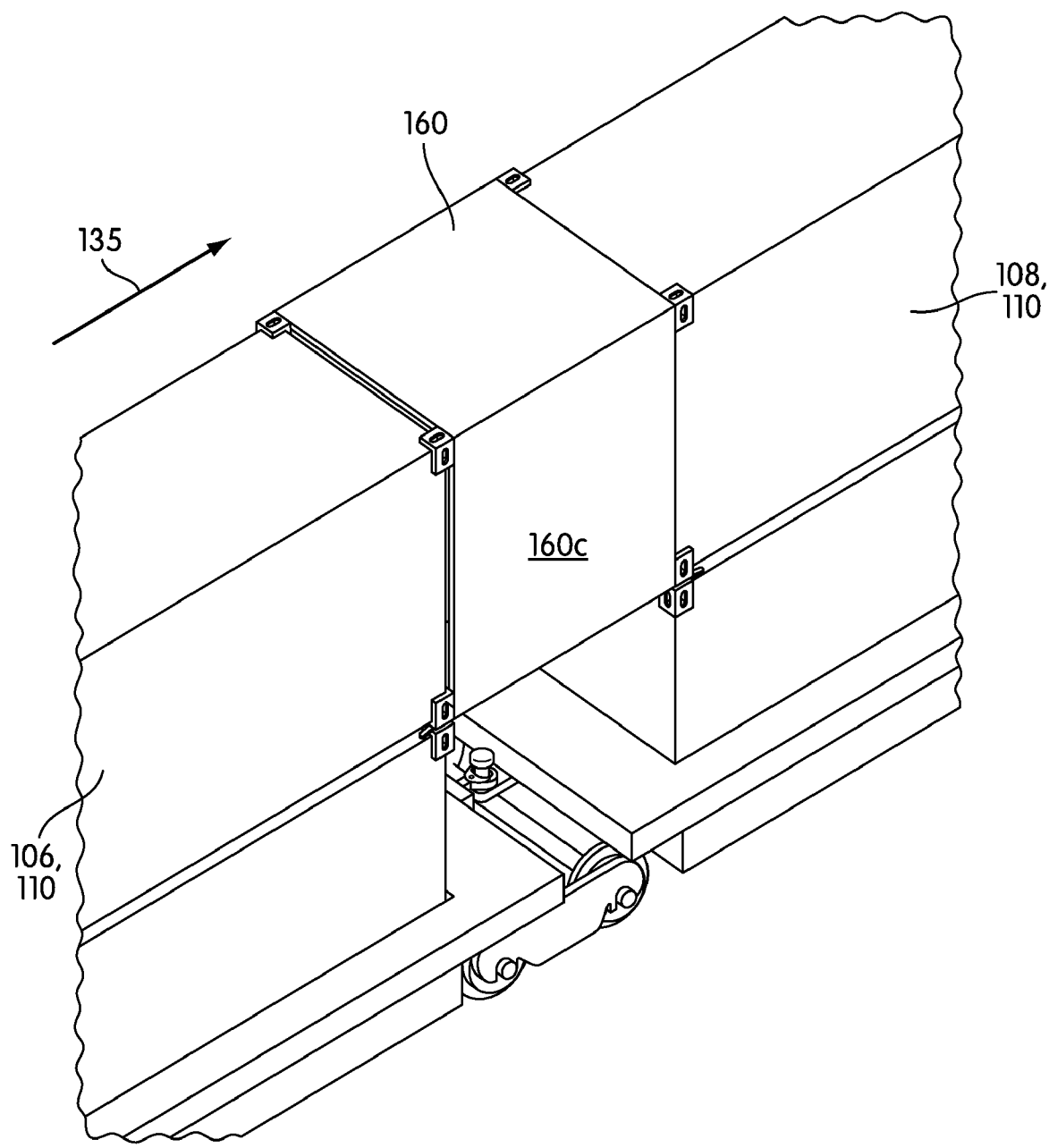

FIGS. 6a-6c illustrate perspective views of curtains 160 for reducing aerodynamic drag or vortices between adjacent sets of stacked intermodal containers in accordance with an embodiment of the present invention. FIG. 2 illustrates curtains 160 mounted between intermediate sets 110 of containers, for example. The mounting of the curtains 160 between a first set 106 of containers and a second set 108 of containers further reduces the vortices between the adjacent sets of containers. The curtains 160 may be mounted directly to a structure provided on the containers 112 or 114 themselves or may be mounted to the frames 126. Generally, any known structure or device may be used to mount the curtains 160 to the sets 110 of containers. For example, devices similar to securing devices 154 may be provided as the mounting structure or as a part of the mounting structure for the curtains 160. However, the type of structure or device for mounting should not be limited. In an embodiment, the connection openings 125 may be used to mount the curtains 160. In an embodiment, the curtains 160 comprise a lightweight, stretchable material that is designed to accommodate changes in shape. For example, as the train 100 turns along a bend or curve in the rail 103, the material is designed to accommodate changes in container-to-container length of the space or gap between the adjacent sets of containers.

As shown in FIG. 6a, the curtain 160 may be provided in the form of a rectangular flat sheet 160a, such that a first end is attached to the back walls 122 of a first set of containers (e.g., containers 106 or containers 110) and a second end is attached to the front walls 120 of a second set of containers (e.g., containers 108 or containers 110). In an embodiment, the curtain 160 may comprise an angled enclosure 160b as shown in FIG. 6b. As shown, the angled enclosure 160b may be designed such that the back walls 122 of the first set of are substantially enclosed by a first end. The sides of the angled enclosure 160b may be angled upwardly toward a second end attached to top portion of the front walls 120 of the second set of containers. The angled enclosure 160b may be attached to the adjacent sets of containers at six points, i.e., four points on the back wall 122 of the first set 106 or 110 of containers and two points on the front wall 120 of the second set 108 or 110 of adjacent containers. In another embodiment, the curtain 160 may comprise a full enclosure 160c designed to substantially enclose the entire space between the adjacent sets of containers as shown in FIG. 6c. The full enclosure 160c may be attached to the adjacent sets of containers at eight points, i.e., four points on the back wall 122 of the first set 106, 110 of containers and four points on the front wall 120 of the second set 108, 110 of adjacent containers.

Similarly to the drag reducing device 140, the curtains 160 are designed such that they may be easy to install by operators as the container need not be adjusted or modified since it uses existing openings (e.g., openings 125). The curtains 160 may be quickly and easily installed (or removed) without risk of harm or injury to the curtain 160 itself, the container, or the operators. In an embodiment, the curtains 160 are removable structures that may be attached to any number of adjacent sets of stacked intermodal containers. In an embodiment, the curtains 160 may be permanently attached to a specified intermodal container. For example, a first end of a curtain 160 may be permanently attached to the back wall 122 of a first intermodal container, whereas a second end of the curtain may be removably attached to a second intermodal container placed adjacent to the first container.

Figure 7A:
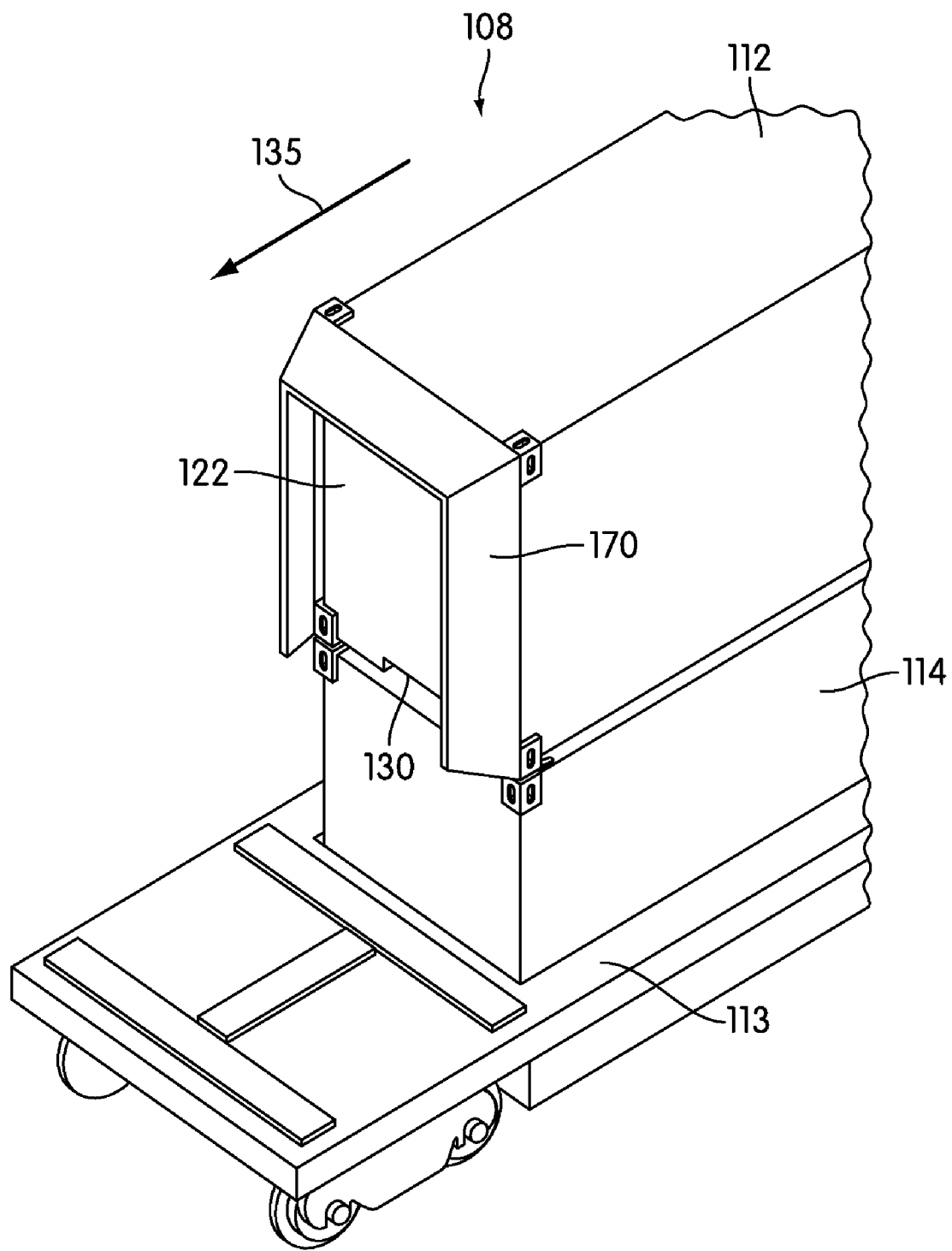
FIG. 7a illustrates a perspective view of a second, aerodynamic drag reducing device attached to a trailing set of stacked intermodal containers in accordance with an embodiment of the present invention.

FIG. 7a illustrates a perspective view of a second, aerodynamic drag reducing device or tail 170 attached to back wall 122 of at least a top container 112 of a trailing set 108 of stacked intermodal containers in accordance with an embodiment of the present invention. The tail 170 also reduces the vortices produce by the air flow 135 when the train 100 or series 104 of stacked intermodal containers are moving in a forward direction 134.

Figure 7B:
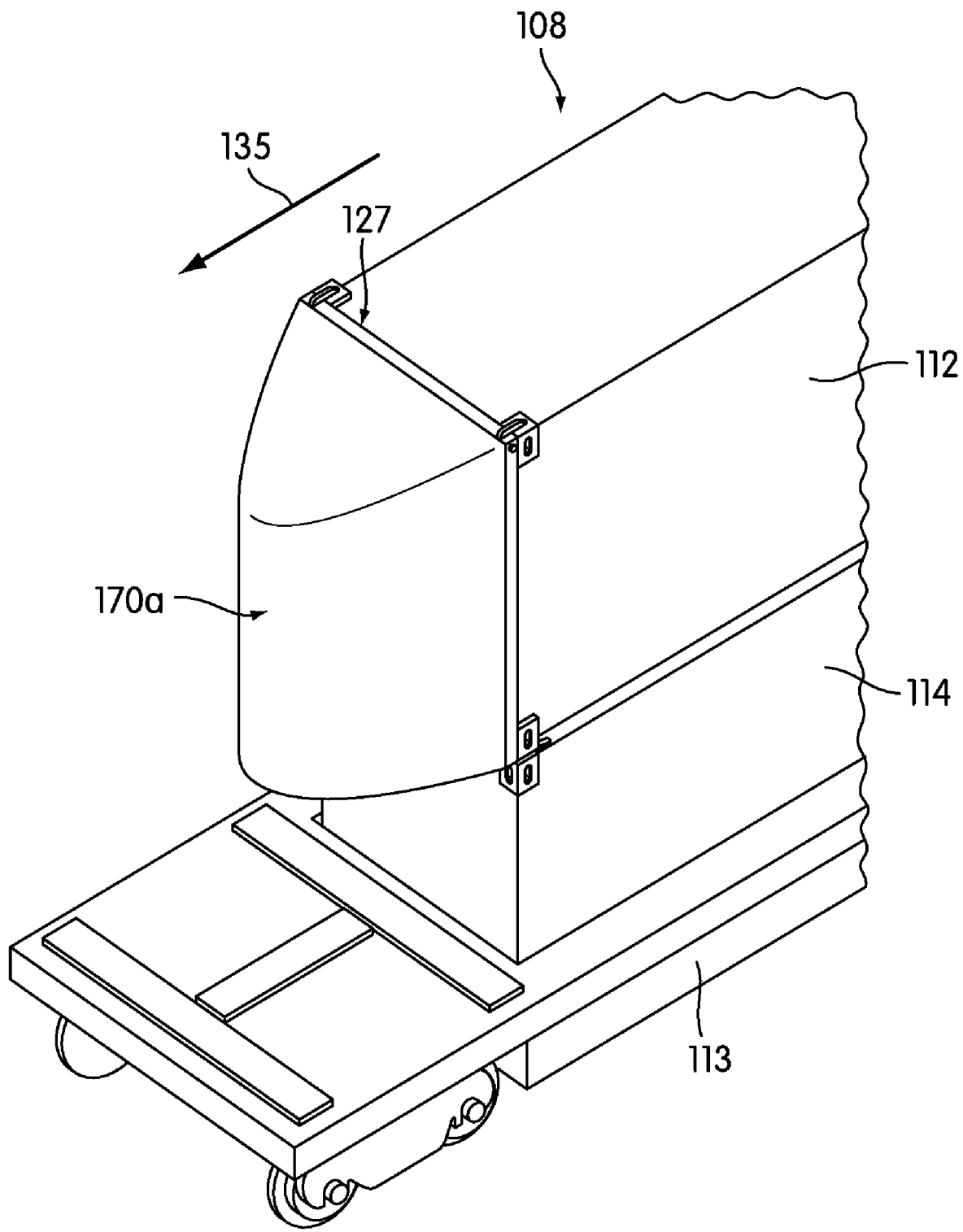
FIG. 7b illustrates an alternative embodiment of a second, aerodynamic drag reducing device for the trailing set of containers in accordance with an embodiment of the present invention.

As shown in FIG. 7b, in an embodiment, the second, aerodynamic drag reducing device or tail 170a may comprise a similar structure as the front-mounted aerodynamic drag reducing device 140 as described above. For example, the tail 170a may be designed to comprise an attachment frame with a mounting device extending therefrom. The first end 127 of the top container 112 of the second, trailing set 108 of stacked containers may be loaded, i.e., stacked, with the tunnel 130 facing toward the rear of the train 100 (e.g., as shown in greater detail in FIG. 7a), or facing away from the direction the locomotive 102 is moving as indicated by arrow 134 and in the direction as indicated by arrow 135. The mounting device of the attachment frame may then be aligned with and inserted into the tunnel 130 to mount the tail 170a to a container 112. For example, the mounting of tail 170a may be the same as the mounting of the aerodynamic drag reducing device 140, and may use the same attachment structure (including the mounting device 146 which is insert into the tunnel 130 and the hooks or other attachments for securement to the corner openings in the tunnel), except that the container is oriented with the tunnel 130 facing rearwardly.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A system for reducing aerodynamic drag of a series of stacked intermodal containers, the series having at least a first, leading set of containers, the set of containers comprising a top container stacked above a bottom container; each of the containers comprising a top wall, a bottom wall, front wall, back wall, and side walls connected by a frame, the bottom wall having a tunnel extending from a first end of the container toward a second end of the container; the top container positioned on the bottom container such that the tunnel of the top container faces a forward direction in line for forward movement; the system comprising:
   an aerodynamic drag reducing device comprising a drag reducing fairing and an attachment frame, the fairing being attached to the attachment frame;
   the attachment frame comprising at least one mounting device extending rearwardly therefrom, and
   wherein the at least one mounting device of the attachment frame is configured to be removably mounted in the tunnel of the top container of the first, leading set of containers in a forward direction such that the aerodynamic drag reducing device faces the forward direction.

2. A system according to claim 1, wherein the at least one mounting device further comprises a releasable clamping device for releasably securing the at least one mounting device within the tunnel of the top container of the first, leading set of containers.

3. A system according to claim 1, wherein the attachment frame further comprises hooks extending from the top portion of the attachment frame for latching into connection openings in a top corner of the top container of the first, leading set of containers.

4. A system according to claim 1, wherein the series further comprises a second, trailing set of containers, each of the containers comprising a top wall, a bottom wall, front wall, back wall, and side walls connected by a frame, the bottom wall having a tunnel extending from a first end of the container toward a second end of the container.

5. A system according to claim 4, further comprising a second, aerodynamic drag reducing device comprising at least a drag reducing fairing attached to an end of the top container of the second, trailing set of containers.

6. A system according to claim 4, wherein the top container of the second, trailing set of containers is positioned such that the tunnel of the top container faces a rearward direction that is opposite the forward direction, and wherein system further comprises a second aerodynamic drag reducing device comprising a second drag reducing fairing and a second attachment frame, the second fairing being attached to the second attachment frame, the attachment frame comprising at least one mounting device extending therefrom, and wherein the at least one mounting device of the attachment frame is configured to be removably mounted in the tunnel of the top container of the second, trailing set of containers such that the aerodynamic drag reducing device extends in the rearward direction from the second attachment frame.

7. A system according to 4, further comprising a plurality of intermediate sets of stacked containers between the first, leading set of containers and the second, trailing set of containers.

8. A system according to claim 7, further comprising a curtain attached between one or more adjacent sets of stacked containers to reduce aerodynamic drag therebetween.

9. A system according to claim 8, wherein the curtain comprises an elastic material.

10. A train comprising:
   a locomotive;
   a series of stacked intermodal containers, the series comprising at least a first, leading set of containers, the set of containers comprising a top container stacked above a bottom container;
   each of the containers comprising a top wall, a bottom wall, front wall, back wall, and side walls connected by a frame, the bottom wall having a tunnel extending from a first end of the container toward a second end of the container;
   the first, leading set of containers comprising a first, aerodynamic drag reducing device comprising a drag reducing fairing and an attachment frame with at least one mounting device attached thereto, the fairing being attached to the attachment frame, and the first, aerodynamic drag reducing device being attached via the at least one mounting device to an end of the top container of the first, leading set of containers such that the aerodynamic drag reducing device faces a forward direction for forward movement;
   the at least one mounting device of the attachment frame configured to be removably mounted in the tunnel of the top container of the first, leading set of containers.

11. A train according to claim 10, wherein the series further comprises a second, trailing set of containers, each of the containers comprising a top wall, bottom wall, front wall, back wall, and side walls connected by a frame, the bottom wall having a tunnel extending from a first end of the container toward a second end of the container;

the second, trailing set of containers comprising a second, aerodynamic drag reducing device comprising a drag reducing fairing and an attachment frame with at least one mounting device attached thereto, the fairing being attached to the attachment frame, and the second, aerodynamic drag reducing device being attached via the at least one mounting device to an end of the top container of the second, trailing set of containers such that the aerodynamic drag reducing device faces a rearward direction that is opposite the forward direction;

the at least one mounting device of the attachment frame configured to be removably mounted in the tunnel of the top container of the second, trailing set of containers.

12. A train according to claim 11, further comprising a plurality of intermediate sets of stacked containers between the first, leading set of containers and the second, trailing set of containers.

13. A train according to claim 12, further comprising a curtain attached between one or more adjacent sets of containers to reduce aerodynamic drag therebetween.

14. A train according to claim 13, wherein the curtain comprises an elastic material.

* * * * *